United States Patent [19]

Shea et al.

[11] Patent Number: 4,944,260
[45] Date of Patent: Jul. 31, 1990

[54] AIR INTAKE HEATER SYSTEM FOR INTERNAL COMBUSTION ENGINES

[75] Inventors: Patrick R. Shea, Columbus, Ind.; Robert T. Niemczyk, Montgomery, Ala.

[73] Assignee: Cummins Electronics, Inc., Columbus, Ind.

[21] Appl. No.: 361,380

[22] Filed: Jun. 5, 1989

[51] Int. Cl.$^5$ ............................................ F02M 31/02
[52] U.S. Cl. .................................. 123/179 H; 123/556
[58] Field of Search ................ 123/556, 179 H, 179 B

[56] References Cited

U.S. PATENT DOCUMENTS

| | | |
|---|---|---|
| 4,089,214 | 5/1978 | Egami et al. ............... 123/556 X |
| 4,186,560 | 2/1980 | Frankl . |
| 4,207,848 | 6/1980 | Dinger et al. . |
| 4,367,700 | 1/1983 | Pace . |
| 4,458,639 | 7/1984 | Abe et al. .................. 123/179 H |
| 4,516,543 | 5/1985 | Abe et al. .................. 123/179 H |
| 4,545,357 | 10/1985 | Kearsley . |
| 4,625,910 | 12/1986 | Kawamura . |
| 4,658,772 | 4/1987 | Auth et al. ................. 123/179 H |
| 4,669,430 | 6/1987 | Reinold et al. ............. 123/179 H |
| 4,723,527 | 2/1988 | Panten et al. . |

OTHER PUBLICATIONS

Lilly, L. R. C., Diesel Engine Reference Book, (Butterworths, 1-1986), Chapter 14, pp. 16-18.

Primary Examiner—Andrew M. Dolinar
Assistant Examiner—M. Macy
Attorney, Agent, or Firm—Woodard,Emhardt,Naughton Moriarty & McNett

[57] ABSTRACT

An air intake heater system for internal combustion engines is disclosed including a microprocessor controller, intake manifold air temperature sensing means, water in fuel sensors, electrical air heating elements actuated by the microprocessor, and system status indicators. Additionally, fuel injector timing is altered by the microprocessor depending upon intake manifold air temperature. Air intake heating is provided to assist cold weather starting of engines as well as for minimizing white smoke pollutants produced by diesel engines. Power consumption of the device is maintained below a predetermined level by judicious use of the microprocessor controller in conjunction with the electrical heating elements.

17 Claims, 10 Drawing Sheets

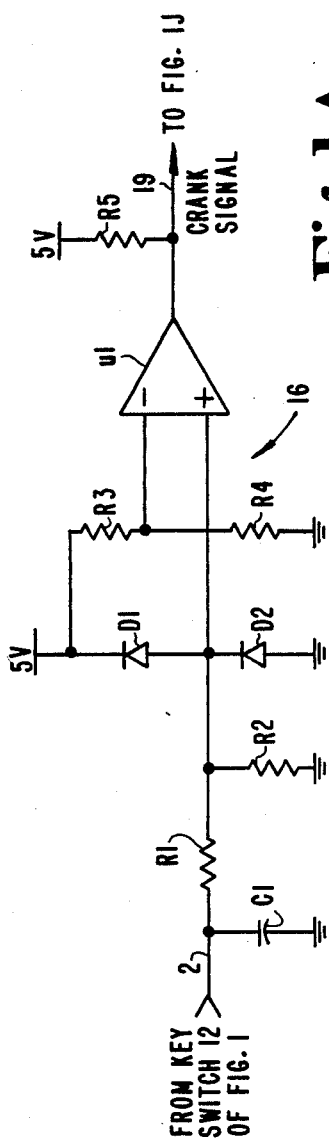
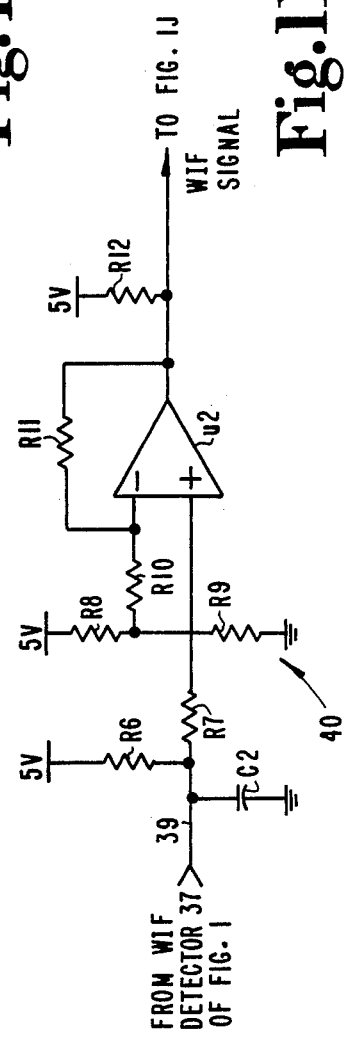
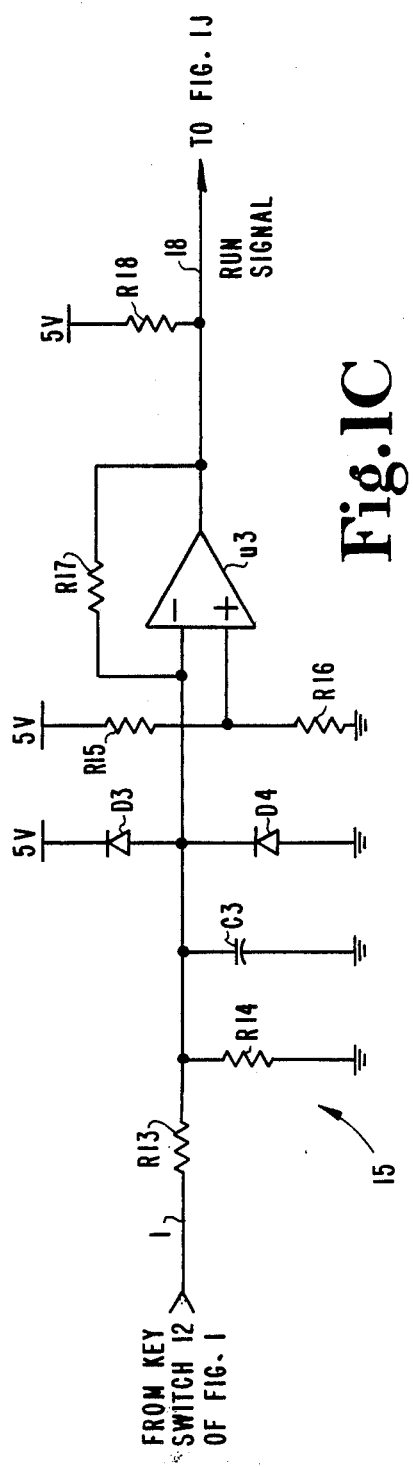

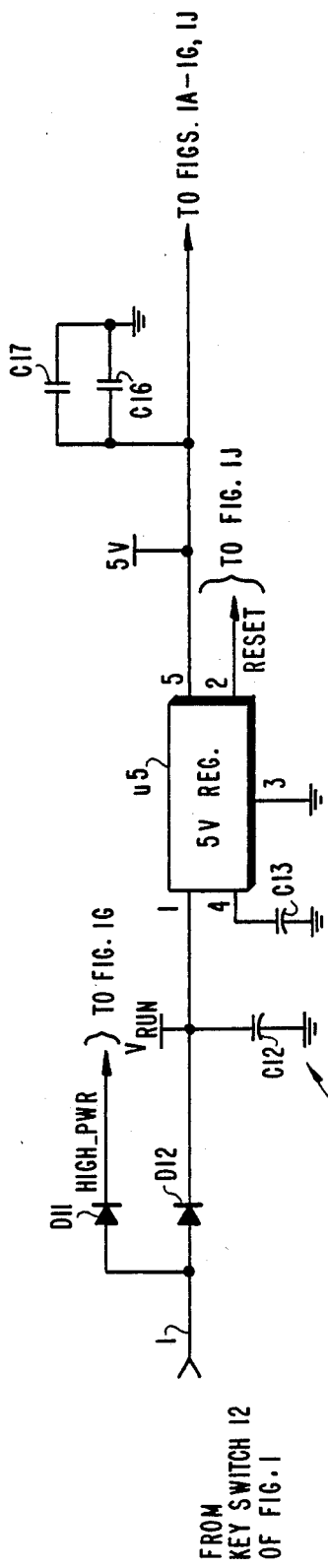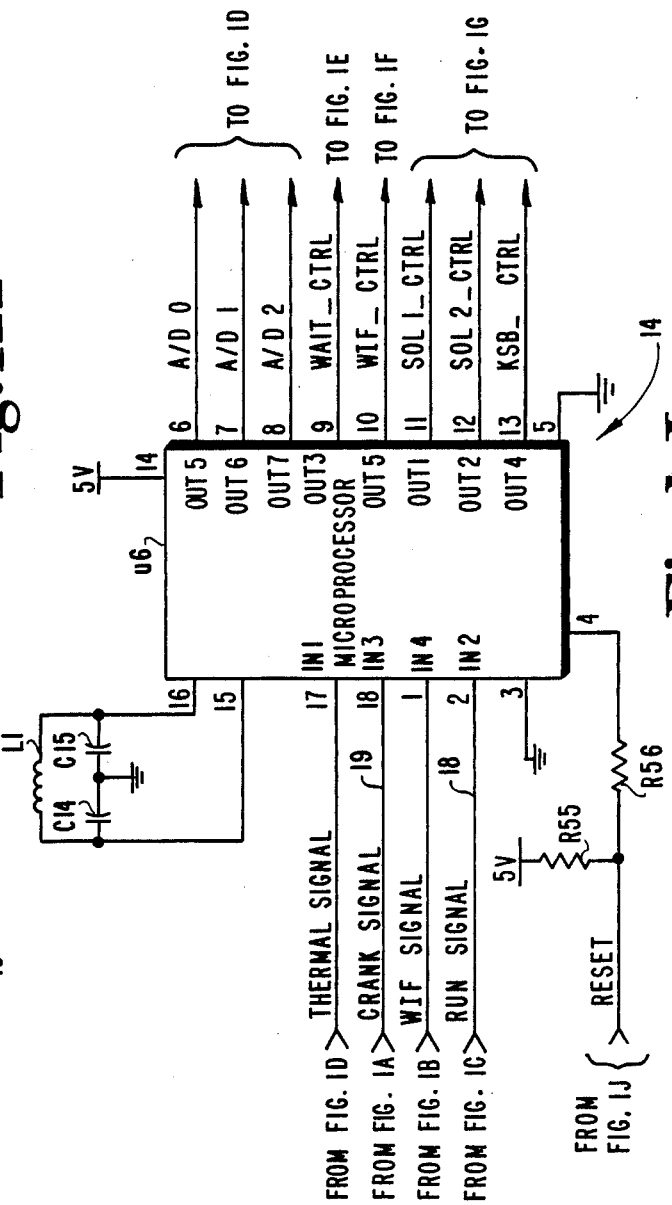

AIR INTAKE HEATER SYSTEM FOR INTERNAL COMBUSTION ENGINES

BACKGROUND OF THE INVENTION

This invention relates in general to internal combustion engines and more specifically to diesel engines and air intake heating subsystems which facilitate cold weather engine starting and control of white smoke exhaust emissions during cold conditions.

An undesirable phenomenon known as "white smoke" is a frequent side effect of no load or light load diesel engine operation at low temperatures. This phenomenon is essentially the result of unburned hydrocarbons in the engine exhaust and is attributable to misfiring or incomplete combustion in some or all cylinders. White smoke is both a resiratory and optical irritant as well as having an adverse effect upon visibility. While white smoke is not a regulated exhaust emission, sociability of the engine or vehicle suffers as a result of the production of white smoke.

In order to improve acceptance of diesel engines in small pickup applications, a means of cold starting and reducing white smoke is required. An additional restriction placed upon the system is that total power consumption requirements must be limited to no more than 4.0 amp-hours due to the particular battery and charging system available in a small pickup truck.

Various prior art devices have been employed to effect heat transfer to the intake air of a diesel engine. A manifold air heater system helps raise the temperature of the combustion air when intake manifold air passes through the intake manifold of the engine by means of an electrically heated element or a combustion burner using a liquid or gaseous fuel. One such electrical heating system is marketed by Robert Bosch, a German company, for use with direct injection engines of up to two liters displacement. The energy consumption of the Bosch unit is 600 watts or more. See "Diesel Engine Reference Book" edited by L. R. C. Lilly, Butterworth and Co. (Publishers) 1984.

An alternate device employed to improve cold starting characteristics of diesel engines is the glow plug device. A heating element or glow plug is located within each combustion chamber of the diesel engine. Each of the glow plugs is connected in parallel to the vehicle battery and power is applied for 30 seconds or more to the glow plugs prior to starting the engine. The glow plug has the effect of heating the internal combustion area of the engine and improving starting performance when temperatures drop below the ambient temperature required for a diesel engine to ignite fuel. Glow plugs are manufactured by Robert Bosch in Germany, Delco Remy in the United States and the Lucas organization in Great Britain. Unfortunately, glow plugs do not aid in reducing the production of white smoke once the engine is running.

U.S. Pat. No. 4,723,527 to Panten et al. discloses an apparatus including a microprocessor controller for increasing inlet air temperature of an engine by way of exhaust gas recirculation techniques. Panten provides a postheat system for heating intake air after the vehicle engine is running. U.S. Pat. No. 4,367,700 discloses an electric resistance heating element for heating inlet air until a control unit senses a preset operating temperature of inlet air. Pace does not address power consumption limitations, nor does Pace provide a systems approach for control of white smoke emissions. Dinger et al., U.S. Pat. No. 4,207,848, discloses a microprocessor controlled heat-exchanger wherein heat from electrically heated water is transferred to intake air. The apparatus shown in U.S. Pat. No. 4,186,560 to Frankl includes a turbo-supercharger system which provides for diversion of compressed air through an air heater. The air heater in Frankl derives heat from the combustion of hydrocarbon fuels and transfers that heat to the compressed air flowing through the heat-exchanger. Further air heating systems deriving heat from a running engine or combustible fuels are shown in patents to Kearsley et al., U.S. Pat. No. 4,545,357, and Kawamura, U.S. Pat. No. 4,625,910.

In view of the aforementioned devices and their deficiencies, an air intake heater system requiring significantly lower power input yet providing effective cold-start assistance as well as reducing white smoke pollutants from engine exhaust would enhance diesel engine applications.

SUMMARY OF THE INVENTION

An air intake heater system according to a typical embodiment of the present invention includes an electrical air intake heater for heating intake air, an air temperature monitoring device, and electronic control means for monitoring intake manifold air temperature and battery voltage and activating the air intake heaters when manifold air temperature is below a predetermined limit. The air heaters are activated for a variable preheat period prior to engine cranking according to the intake manifold air temperature detected by the system. After the engine is running, the air heating devices are variably activated in such a manner as to economically heat intake air according to the temperature of the intake manifold air.

One object of this invention is to provide an improved air intake heating system for use with diesel engines.

Another object of the present invention is to provide an air intake heating system for reducing the amount of white smoke pollutants produced by the engine during the warm up phase of the running engine.

Another object of the invention is to provide an air intake heater system which enables cold starting, reduces white smoke, yet consumes power at a rate lower than available alternative devices.

Related objects and advantages of the present invention will be apparent from the following description.

BRIEF DESCRIPTION OF THE DRAWINGS

FIG. 1A is an electrical schematic of the signal conditioning circuit 16 of FIG. 1.

FIG. 1B is an electrical schematic of the signal conditioning circuit 40 of FIG. 1.

FIG. 1C is an electrical schematic of the signal conditioning circuit 15 of FIG. 1.

FIG. 1H is an electrical schematic of the 5-volt regulator circuit 15 of FIG. 1.

FIG. 1J is an electrical schematic of the microprocessor 14 of FIG. 1 including pin numbers and I/O connections.

DESCRIPTION OF THE PREFERRED EMBODIMENT

Figure 1:
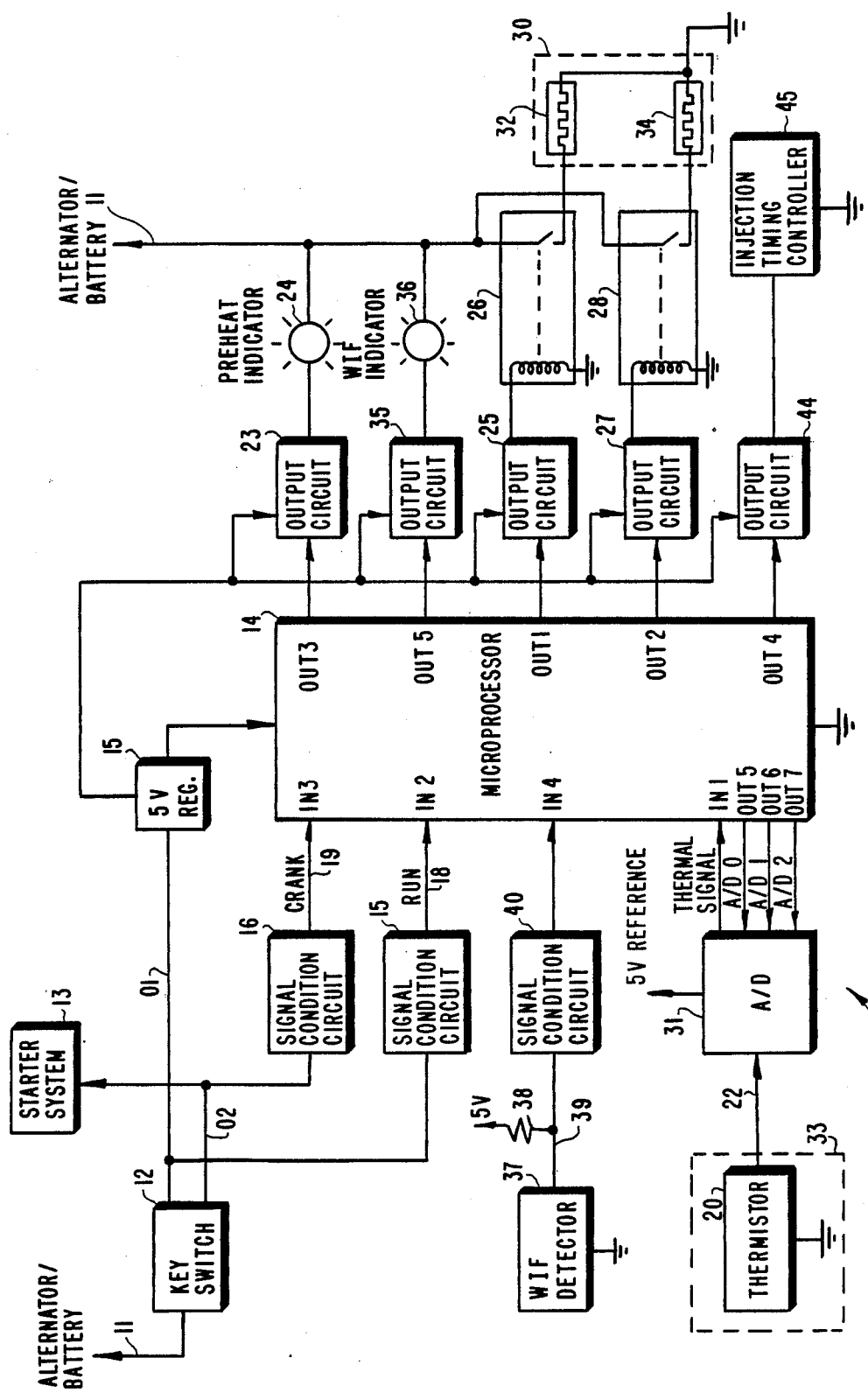
FIG. 1 is a schematic diagram of an air intake heater system according to a typical embodiment of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a schematic diagram for an air intake heater system 10 is shown. A battery/alternator power source signal is connected to the input of key switch 12 by signal path 11 hereinafter referred to as signal 11. Key switch 12 is a three position switch having an "off" position, a "run" position, and a "crank" position. In the "off" position the key switch disconnects signal 11 from microprocessor 14. In the "run" position, key switch 12 interconnects signal 11, by way of signal path 01, to voltage regulator 15 which in turn supplies regulated five volts to microprocessor 14. In the "crank" position, key switch 12 connects signal 11 to regulator 15, starter system 13, and signal condition circuitry 16 simultaneously. The three positions described above for the key switch 12 correspond to those normally encountered in a motor vehicle wherein the key switch is initially placed in the "run" position to supply power to the electrical system of the vehicle and upon further rotation of the switch into the "crank" position, the starter solenoid of the vehicle is engaged to start the engine. (The engine is not shown in the drawings.)

Signal conditioning circuitry block 16 consists of a comparator and voltage reference, allowing the circuitry to indicate to microprocessor 14 when an engine crank condition exists via signal 19. Any voltage in excess of 5 volts, nominal, at signal path 02 indicates that key switch 12 is in the crank position.

Signal conditioning circuitry block 15 consists of a comparator and voltage reference, allowing the circuitry to indicate to microprocessor 14 when the voltage at signal 01 is in excess of 13 volts.

Thermistor 20 is located within the intake manifold 33 represented by a broken line downstream from the heaters 32 and 34 which are located within air heater assembly 30, represented by a broken line. Signal path 22, hereinafter referred to as signal 22, connects the junction point of resistor 21 and thermistor 20, to the input of analog to digital converter 31, hereinafter referred to as A/D converter 31.

Water-in-fuel (WIF) detector 37 is located in the fuel filter assembly. Signal path 39 carries the voltage found between resistor 38 and WIF detector 37 to signal conditioning circuit 40. Excessive water can cause serious damage to diesel fuel systems, thus the described system incorporates a detector and a warning light to indicate the presence of excessive amounts of water in the fuel tank.

Microprocessor 14 has eight outputs which control various functions of the system. Outputs 1 and 2 (OUT1 and OUT2) of microprocessor 14 control relays 26 and 28, respectively, which in turn switch power to thermal heating elements 32 and 34. Elements 32 and 34 are located within the air intake heater assembly 30, through which intake air is drawn during engine operation. Signal 11 is connected to relays 26 and 28 thereby supplying a power signal for the heating elements or heaters 32 and 34, such that when relays 26 and 28 are activated, the relay solenoid closes the contacts and causes signal 11 to be supplied to the heating elements 32 and 34. Output 3, or OUT3, of microprocessor 14 controls preheat indicator 24, causing output circuit 23 to provide a signal path for sinking current when placed in the active state, thereby allowing current to flow through preheat indicator 24. Preheat indicator 24 is a lamp indicator which is connected to signal 11, a source of power.

Output OUT4 of microprocessor 14 controls output circuit 44 which in turn controls the KSB injector timing controller 45. Injection timing is varied by this output via a logic level signal varying injector timing from cold operation to normal operation. Microprocessor 14 signals the injector timing controller 45 that the engine is either warm or cold by way of output circuit 44. Output OUT5 of microprocessor 14 controls the water-in-fuel output circuit 35. The output circuit 35 in turn supplies a current path to ground for current flowing through WIF indicator 36. The source of power for the WIF indicator is signal 11. Microprocessor 14, WIF sensor 37, injection timing controller 45, thermistor 20, heating elements 32 and 34 are all tied to ground reference signals as shown in FIG. 1. Outputs OUT5, OUT6, and OUT7 control A/D converter 31.

Operationally, microprocessor 14, upon receiving a power-up signal (i.e. key switch 12 is switched to the "run" position from the "off" position) via signal path 16, initializes outputs and begins to monitor the intake manifold air temperature by way of the signal from thermistor 20, through A/D converter 31. If the intake manifold air temperature of the engine is below a predetermined level, as indicated by the voltage on signal 22, the microprocessor 14 will enter a preheat routine and energize the coils of relays 26 and 28. Once energized, the contacts of relays 26 and 28 close, thereby supplying power to heating elements 32 and 34 of air intake heater assembly 30. Preheat indicator 24 is illuminated via output OUT3 during the preheat period.

Once the variable preheat period, determined according to manifold air temperature by microprocessor 14, has expired, preheat indicator 24 is extinguished by microprocessor 14 thereby informing the operator of the vehicle that the preheat period is over and the engine is ready for cranking or starting. At this point, the operator then places key switch 12 into the "crank" position causing alternator/battery power signal 11 to be supplied to starter system 13 and the engine will turn over and begin running.

Microprocessor 14 thereafter monitors signal path 1, hereinafter signal 1, via signal conditioning circuit 15 until the voltage on signal 1 exceeds the normal operating voltage of the battery, i.e., a 12-volt system normally has a 12-volt battery and an alternator that produces a charging voltage of 13.8 volts, nominal. The presence of a voltage in excess of 13 volts at signal 1, after the engine has been cranked, is an indication to microprocessor 14 that the engine is running.

The amount of manifold air heating required to aid starting and reduce white smoke is directly dependent upon the initial precrank condition manifold air temperature. The manifold air temperature provides the only source of information required by the microprocessor 14 for determining the timing criteria for energizing relays 26 and 28. One skilled in the art will recognize that a warmed engine, one which has been running recently, will keep thermistor 20 warmer than intake manifold air thereby reducing or eliminating air heating requirements as compared to conditions existing with a completely cold engine.

Table 1 provides one possible guide for energizing the heating elements 32 and 34, depending directly upon intake manifold air temperature. Based upon initial intake manifold air temperature, preheat duration is selected from Table 1. Postheat durations and duty cycling of the heating elements are determined also by initial intake manifold air temperature. For example, if the intake manifold air temperature prior to preheat is $-17°$ C., preheat includes energizing both heating elements 32 and 34 for 15 seconds at 100/0 on/off duty cycle. From Table 1, postheat at $-17°$ C. includes sequentially energization of: both heating elements for the next 13.4 seconds at 100/0 on/off duty cycle; one heating element for the following 13.4 seconds at 100/0 duty cycle; one heating element for the next 60 seconds at 50/50 duty cycle and one heating element for 90 seconds at 25/75 percent on/off duty cycle.

TABLE 1

| Air Temperature | Heaters | Duration | Duty Cycle % On/% Off |
|---|---|---|---|
| $<-26°$ C. | Preheat Both | 20 sec | 100/0 |
| $<-15°$ F. | Postheat Both | 13.4 | 100/0 |
| | One | 13.4 | 100/0 |
| | One | 60 | 50/50 |
| | One | 90 | 25/75 |
| $-26$ to $-18°$ C. | Preheat Both | 17.5 sec | 100/0 |
| $-15$ to $0°$ F. | Postheat Both | 15 | 100/0 |
| | One | 60 | 50/50 |
| | One | 90 | 25/75 |
| $-18$ to $-9°0$ C. | Preheat Both | 15 sec | 100/0 |
| 0 to 15 ° F. | Postheat Both | 16 | 100/0 |
| | One | 60 | 50/50 |
| | One | 90 | 25/75 |
| $-9$ to $0°$ C. | Preheat Both | 10 sec | 100/0 |
| 15 to 32° F. | Postheat Both | 10 | 100/0 |
| | One | 60 | 50/50 |
| | One | 90 | 25/75 |
| 0 to 15° C. | Preheat NONE | | |
| 32 to 59° F. | Postheat Both | 10 sec | 100/0 |
| | One | 60 | 50/50 |
| | One | 90 | 25/75 |
| $>15°$ C. | Preheat NONE | | |
| $>59°$ F. | Postheat NONE | | |

Referring now to FIG. 1A, an electrical schematic for the signal conditioning circuit 16 of FIG. 1, according to the present invention is shown. Signal 2 is supplied to the input of the circuit and is divided by resistor divider R1 and R2. Diodes D1 and D2 provide over-voltage protection for the inputs of comparator U1. Resistors R3 and R4 provide a comparison voltage for the negative input of comparator U1. Resistor R5 is a pull up resistor for the open collector output of comparator U1. The output of comparator U1 is supplied to input IN3 of microprocessor 14 of FIG. 1.

Referring now to FIG. 1B, an electrical schematic for the signal conditioning circuit 40 of FIG. 1 according to the present invention is shown. An input to the circuit is supplied via signal path 39 and is divided by resistor divider R6 and R7. Resistor divider R8 and R9 provide a reference voltage to input resistor R10 for the positive input of non-inverting comparator U2. Resistor R11 provides hysteresis for the input signal at the negative input of comparator U2. R12 is a pull up resistor for the open collector output of comparator U2. The output of comparator U2 is supplied to input IN4 of microprocessor 14 in FIG. 1.

Referring now to FIG. 1C, an electrical schematic for the signal conditioning circuit 15 according to the present invention is shown. The signal present on signal path 1 is supplied to the input of the circuit and is divided by resistors R13 and R14 into a smaller voltage. Diodes D3 and D4 provide over-voltage protection for the input of comparator U3. Resistors R15 and R16 divide the 5 volt regulated voltage in half supplying a 2.5 volt signal to the negative input of comparator U3. Resistor R17 provides hysteresis for the input signal supplied to the positive input of comparator U3. Resistor R18 is a pull up resistor for the open collector output of comparator U3. Signal path 18 connects the output of comparator U3 to the IN2 input of microprocessor 14 in FIG. 1.

Figure 1D:
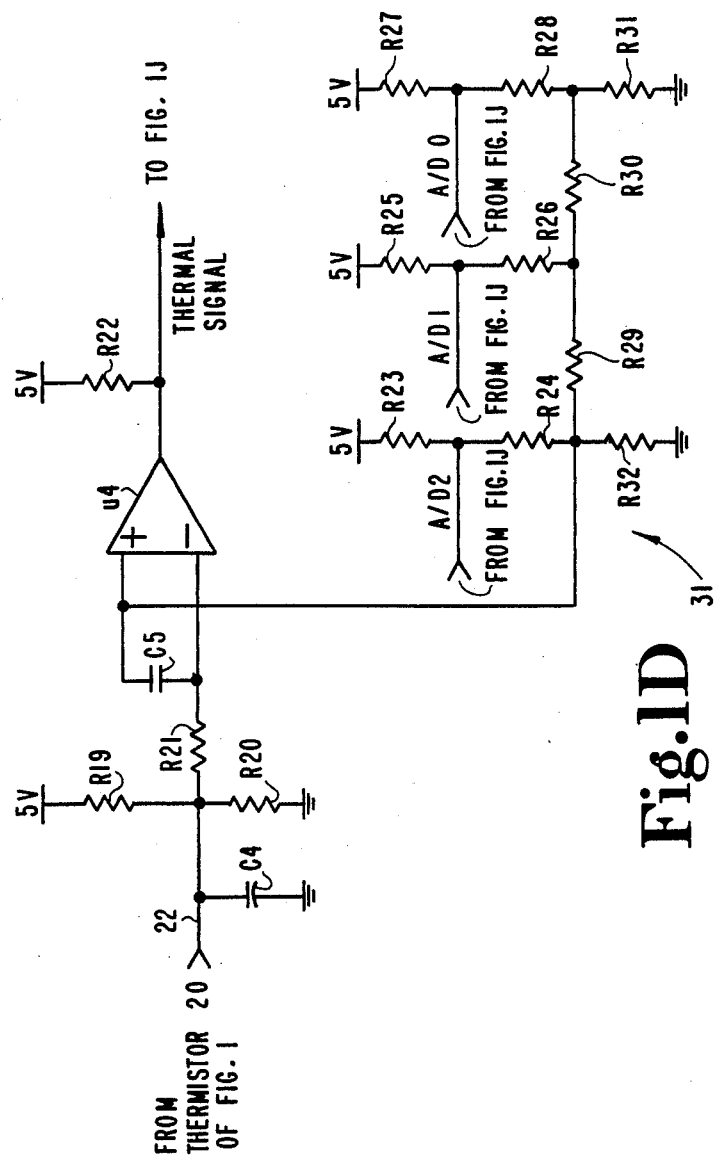
FIG. 1D is an electrical schematic of the A/D converter 31 of FIG. 1.

Referring now to FIG. 1D, an electrical schematic for the A/D converter 31 of FIG. 1 according to the present invention is shown. A signal from thermistor 20 is supplied via signal path 22 to the input of the circuit. Resistors R19 and R20 provide a bias voltage supplied through resistor R21 to the negative input of comparator U4. Resistor R22 is a pull-up resistor for the open collector output of comparator U4. Logic signals from outputs OUT5, OUT6, and OUT7 of the microprocessor 14 of FIG. 1 are supplied to the inputs labeled A/D0, A/D1, and A/D2 respectively and provide control for the comparison voltage supplied to the plus input of comparator U4. The eight possible combinations of signals supplied to the A/D0-A/D2 inputs enable microprocessor 14 of FIG. 1 to quantize the voltage present at signal 22 into one of eight voltage ranges. These voltage ranges correspond to temperature ranges for the thermistor 20 of FIG. 1 as the thermistor varies in resistance according to temperature sensed at the air intake of the system.

Figure 1E:
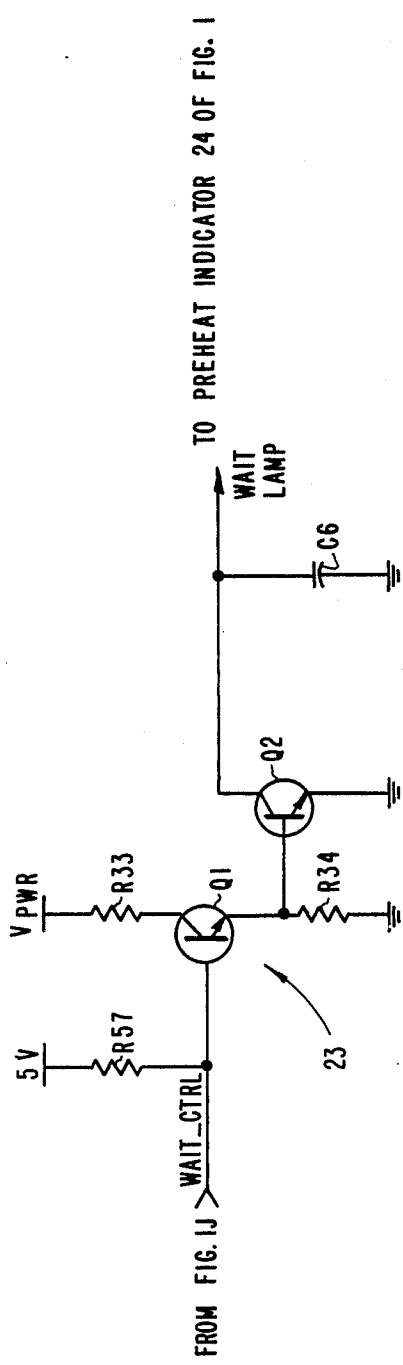
FIG. 1E is an electrical schematic of the output circuit 23 of FIG. 1.

Referring now to FIG. 1E, an electrical schematic for the output circuit 23 according to the present invention is shown. An output from microprocessor 14, OUT3, is supplied to the input of the circuit from FIG. 1J. Resistor R57 is a pull up resistor for the base of transistor Q1. When the signal supplied to the input of the circuit is a logic one signal, at or near plus five volts, resistor Q1 turns on allowing current to flow from $V_{PWR}$ through resistor R33 and resistor R34. Once current begins to flow through resistor R34, the base of transistor Q2 is raised above 0.7 volts and transistor Q2 is biased into the forward active region. Once transistor Q2 is biased into the forward active region, or turned on, a current path is created for current flowing through preheat indicator 24 of FIG. 1 through transistor Q2 to ground thereby illuminating preheat indicator 24.

Figure 1F:
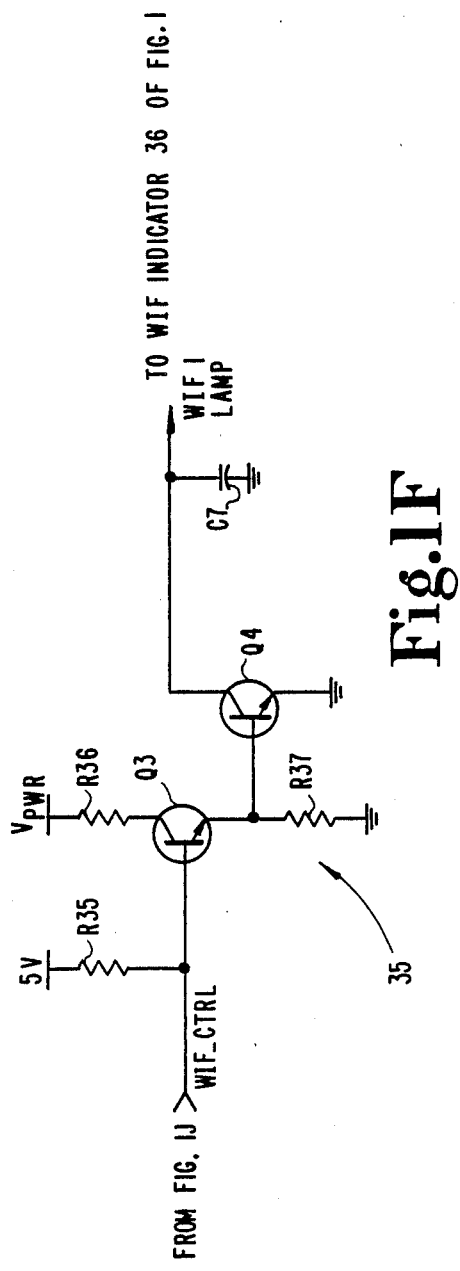
FIG. 1F is an electrical schematic of the output circuit 35 of FIG. 1

Referring now to FIG. 1F, an electrical schematic for the output circuit 35 of FIG. 1 is shown. The circuit of FIG. 1F functions identically to the circuit of FIG. 1E. A logic level input signal from the microprocessor is supplied to the input of the circuit labeled WIF CTRL. Resistor R35 is a pull-up resistor for the base of transistor Q3. A high logic level signal supplied to the input of this circuit biases transistor Q3 into the forward active region and allows current to flow through resistor R36 and R37 to ground. The current flow through resistor R37 sets up a voltage at the base of transistor Q4 biasing transistor Q4 into the forward active region, thereby providing a current path to ground for current flowing through the WIF indicator 36 of FIG. 1, and illuminating the WIF indicator.

Figure 1G:
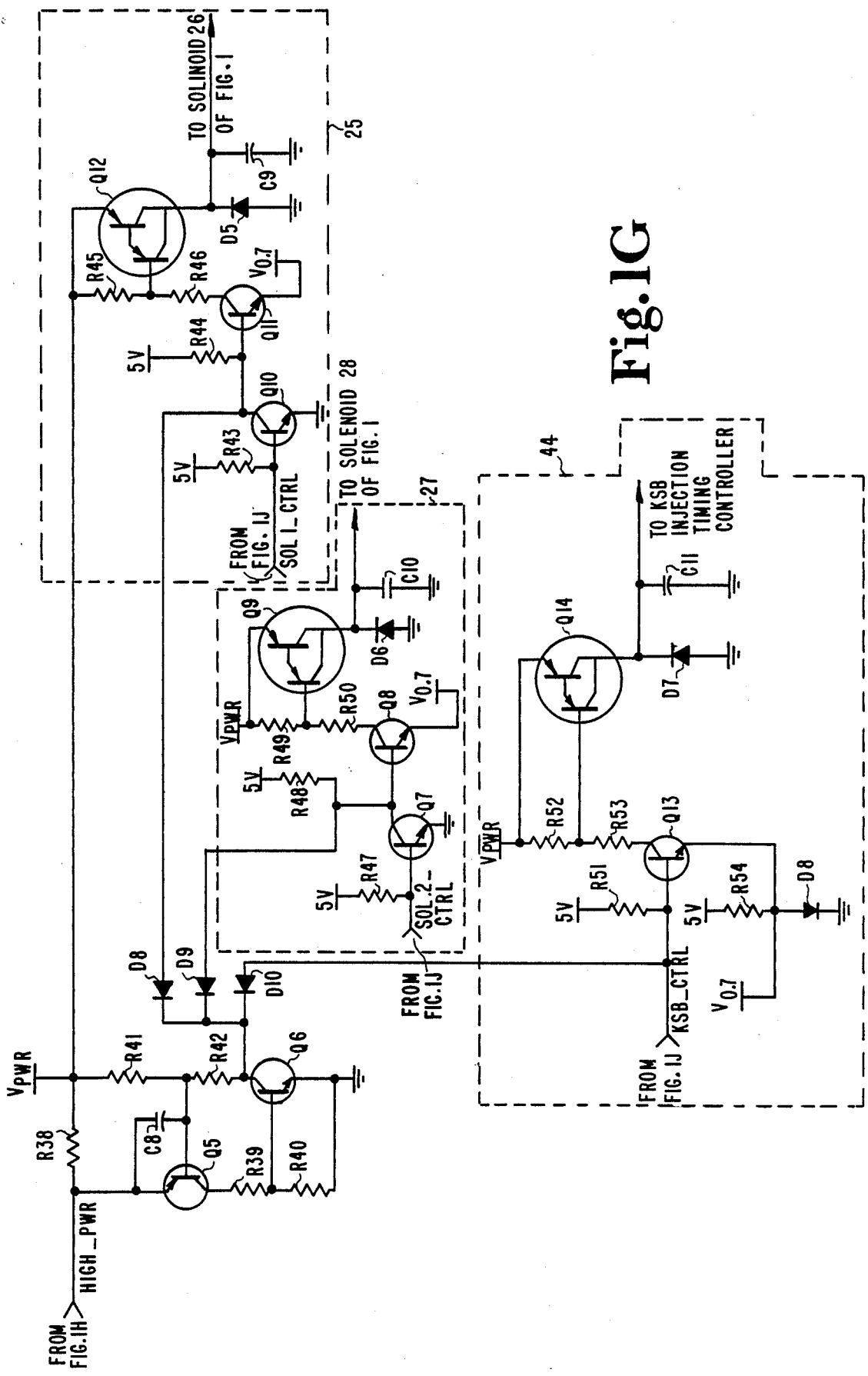
FIG. 1G is an electrical schematic of the output circuits 25, 27 and 44 of FIG. 1.

Referring now to FIG. 1G, an electrical schematic is shown for the output circuits 25, 27 and 44 of FIG. 1 according to the present invention. Circuits 25 and 27 provide a high power current signal for the solenoid coils of relays 26 and 28 of FIG. 1. Output circuit 44 is an output buffer for the signal supplied to the KSB injection timing controller 45 of FIG. 1 from microprocessor 14. The KSB timing controller is manufactured by Robert Bosch of West Germany. Circuits 25, 27 and 44 receive a logic level input signal from microprocessor U6 of FIG. 1J. The input for circuit 25 is applied to the base of transistor Q10. The input for circuit 27 is supplied to the base of transistor Q7. The input for circuit 44 is supplied to the base of transistor Q13. The circuit consisting of resistors R38 through R42 and transistors Q5 and Q6 provides an overcurrent protection latch pulling the inputs of circuits 25, 27 and 44 low and preventing the power output devices transistors Q9, Q12 and Q14 from turning on and supplying current if the current flowing through resistor R38 exceeds approximately 7.5 to 8.0 amps. Transistor Q5 and Q6 act as a latch and by way of diodes D8, D9 and D10 pull the inputs to transistors Q10, Q7 and Q13, respectively low if the current through resistor R38 is excessive. This feature prevents damage to the output transistors Q9, Q12 and Q14 if the sum of the current flowing through the three power output transistors exceeds approximately eight amps.

Referring now to FIG. 1H, a more detailed electrical schematic of the 5 volt regulator circuit 15 of FIG. 1 according to the present invention is shown. Power is supplied via signal path 1 to the input of the circuit. Diodes D11 and D12 provide isolation to block negative transients from the alternator/battery signal path 11 of FIG. 1 to the 5 V regulator and the circuitry of FIG. 1G. Device U5 is a 5 volt regulator device and also provides a logic level output signal from pin 2 supplied to microprocessor U6 of FIG. 1J to reset the microprocessor when the 5 volt regulator is initially powered up. The 5 volt output from the regulator U5 is supplied to FIGS. 1A through 1G, and FIG. 1J at all places as similarly shown where 5 volts is indicated by the letters 5 V.

Referring now to FIG. 1J, a more detailed schematic of the microprocessor U6 of FIG. 1 according to the present invention is shown. Input signals are supplied to pins 17, 18, 1, and 2. Output signals are produced by the microprocessor U6 at pins 6 through 13. The reset signal from the 5 volt regulator of U5 of FIG. 1H is supplied to input pin 4 through resistor R56. Capacitor C14 and C15, coupled with inductor L1 provide the oscillator timing components for the microprocessor U6.

The following Table lists the component values and device types of FIGS. 1A–1J.

TABLE 2

|  | Value | Tolerance/Power Rating |
|---|---|---|
| R1 | 10 K | 5% |
| R2 | 10 K | 5% |
| R3 | 1 K | 1% |
| R4 | 1 K | 1% |
| R5 | 4.7 K | 5% |
| R6 | 39 K | 5% |
| R7 | 10 K | 5% |
| R8 | 1 K | 1% |
| R9 | 1 K | 1% |
| R10 | 10 K | 5% |
| R11 | 330 K | 5% |
| R12 | 4.7 K |  |
| R13 | 38.3 K | 1% |
| R14 | 10 K | 1% |
| R15 | 1 K | 1% |
| R16 | 1 K | 1% |
| R17 | 470 K |  |
| R18 | 4.7 K |  |
| R19 | 137 K | 1% |
| R20 | 1.00' | 1% |
| R21 | 10 K |  |
| R22 | 4.7 K |  |
| R23 | 4.7 K |  |
| R24 | 97.6 K | 1% |
| R25 | 4.7 K |  |
| R26 | 97.6 K | 1% |
| R27 | 4.7 K |  |
| R28 | 97.6 K | 1% |
| R29 | 49.9 K | 1% |
| R30 | 49.9 K | 1% |
| R31 | 100 K | 1% |
| R32 | 200 K | 1% |
| R33 | 1 K | 5%/¼ w |
| R34 | 1 K |  |
| R35 | 4.7 K |  |
| R36 | 1 K | 5%/¼ w |
| R37 | 1 K |  |
| R38 | 0.1 | 1%/3 w |
| R39 | 2.2 K |  |
| R40 | 1 K |  |
| R41 | 1 K |  |
| R42 | 2.2 K |  |
| R43 | 4.7 K |  |
| R44 | 4.7 K |  |
| R45 | 1 K |  |
| R46 | 470 | 5%/¼ w |
| R47 | 4.7 K |  |
| R48 | 4.7 K |  |
| R49 | 1 K |  |
| R50 | 470 | 5%/¼ w |
| R51 | 4.7 K |  |
| R52 | 1 K |  |
| R53 | 470 | 5%/¼ w |
| R54 | 1 K |  |
| R55 | 4.7 K |  |
| R56 | 100 |  |
| R57 | 4.7 K |  |
| C1 | .1 µF | 50 V |
| C2 | .1 µF | 50 V |
| C3 | .1 µF | 50 V |
| C4 | .1 µF | 50 V |
| C5 | 22 pF |  |
| C6 | .1 µF | 50 V |
| C7 | .1 µF | 50 V |
| C8 | .047 µF |  |
| C9 | .1 µF | 50 V |
| C10 | .1 µF | 50 V |
| C11 | .1 µF | 50 V |
| C12 | 470 µF | 63 V |
| C13 | .1 µF | 50 V |
| C14 | 180 pF | — |
| C15 | 180 pF | — |
| C16 | 150 µF | 10 V |
| C17 | .1 µF | 50 V |
| L1 | 220 82 F |  |

|  | Type | Manufacturer |
|---|---|---|
| D1 | 1N4148 | Motorola semiconductor |

TABLE 2-continued

| | | |
|---|---|---|
| D2 | 1N4148 | Products, Inc. |
| D3 | 1N4148 | Box 20912 |
| D4 | 1N4148 | Phoenix, Arizona 85036 |
| D6 | 1N4004 | " |
| D7 | 1N4004 | " |
| D8 | 1N4148 | " |
| D9 | 1N4148 | " |
| D10 | 1N4148 | " |
| D11 | MR754 | " |
| D12 | 1N4004 | " |
| U1, U2 | LM139 | " |
| U3, U4 | " | " |
| Q1, Q3 | MPSA06 | " |
| Q6, Q7, | " | " |
| Q8, Q10, | " | |
| Q11, Q13 | " | |
| Q2, Q4 | MPSW06 | " |
| Q5 | MPSA56 | " |
| Q9, Q12, | T1P106 | " |
| Q14 | " | |
| U5 | TEA7034 | SGS Thompson Semiconductor |
| U6 | PIC1654 | Microchip Technology Corp. (formerly General Instrument) |

Note all resistors are 5% tolerance and ¼ W unless specified otherwise

Figure 2A:
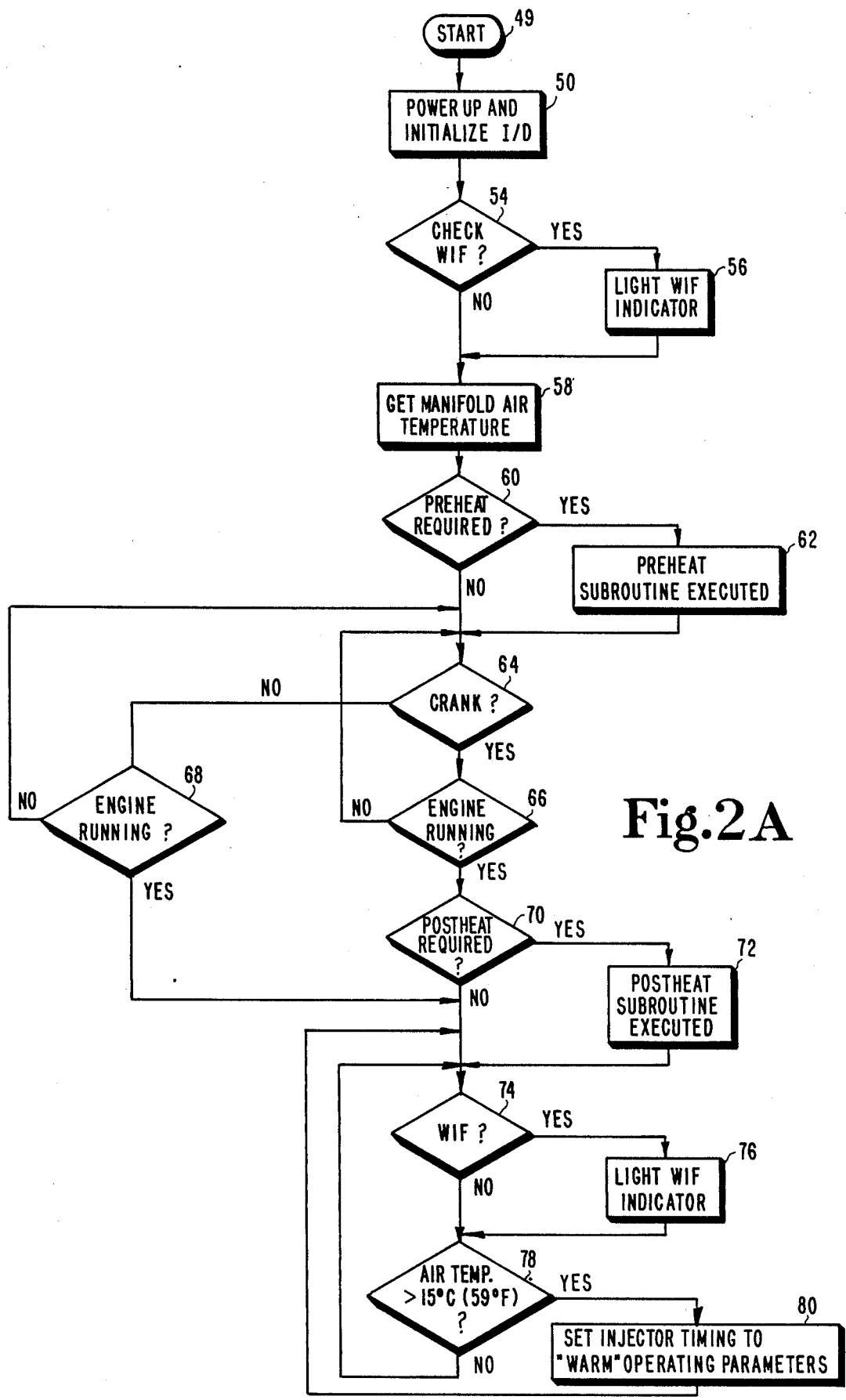
FIG. 2A is a flow chart of the program executed by the microprocessor of the air intake heater system.

Referring now to FIG. 2A, a flow chart depicting the program stored in internal read only memory (ROM) of microprocessor 14 is shown. The program begins at step 49. At step 50 the microprocessor executes a power up routine and initializes the microprocessor outputs to a predetermined initialization state. A typical initialization of the microprocessor inputs/outputs includes forcing the outputs to logic levels necessary to deactivate any devices subject to microprocessor control. At step 54, the water-in-fuel input to microprocessor 14 is tested. If the input signal from the water-in-fuel detector 37 indicates water is present in the fuel tank of the vehicle, the water-in-fuel indicator 36 is energized at step 56 and the program continues execution at step 58. If water is not detected in the fuel reservoir, the program will skip from step 54 to step 58.

Decision step 68 is intended to detect a push start of the vehicle. If at step 68 it is determined that the engine is not running, tested via signal 18 voltage, program execution returns to step 64. However, if the engine is running, postheat is bypassed and program execution skips to step 74.

At step 58 the intake manifold air temperature is ascertained by microprocessor 14 via the A/D input circuit 31. At step 60, microprocessor 14 begins the decision making process of whether or not a preheat period is required based upon the temperature of the intake manifold air determined at step 58. If preheat is required, according to Table 1, program execution continues at step 62 where the preheat subroutine is executed. If preheat is not required, as determined by the intake manifold air temperature obtained at step 60, program execution continues with microprocessor 14 monitoring signal 19 at step 64. At step 64 signal 19 is monitored, and if signal 19 indicates a "crank" condition, program execution will continue at step 66. If signal 19 does not indicate a "crank" condition, program execution will continue at step 68 where the microprocessor 14 ascertains whether or not the engine is running. A "running" engine is detected by monitoring the voltage from the ignition switch on signal 18 which will be above a predetermined voltage if the engine is running and the alternator raises the voltage of signal 11 to 13 volts or more.

If at step 64 the "crank" condition is detected, wherein a power signal is supplied to starter system 13, then program execution will continue with step 66. At step 66 microprocessor 14 determines whether the engine is running by monitoring signal 18 for a voltage above a predetermined value, typically 13 volts or higher. If the engine is not running, program execution returns to step 64, and if the engine is running, program execution will continue at step 70.

At step 70 microprocessor 14 refers back to the intake manifold air temperature determined at step 58 and decides whether or not postheat is required based upon the intake manifold air temperature. If postheat is required, the postheat subroutine is next executed at step 72. Otherwise, the program continues execution at step 74 where microprocessor 14 once again monitors the input from the WIF detector 37, and energizes an indicator at step 76 if water is present in the fuel system. If water is not detected in the fuel, program execution continues at step 78 where the intake manifold air temperature is determined via A/D converter 31. If the intake manifold air temperature is above 15° C., or 59° F., program execution will continue at step 80 where the injector timing controller is energized via controlling signal OUT4 from microprocessor 14 causing the injector timing controller 45 to begin operating according to parameters designed for the operation of the engine at warm temperatures. If the temperature of the intake manifold air determined at step 78 is below 15° C., then program execution returns to step 74 where the program loop continues to endlessly execute steps 74, 76, 78, and 80, according to the conditional parameters described therein.

Figure 2B:
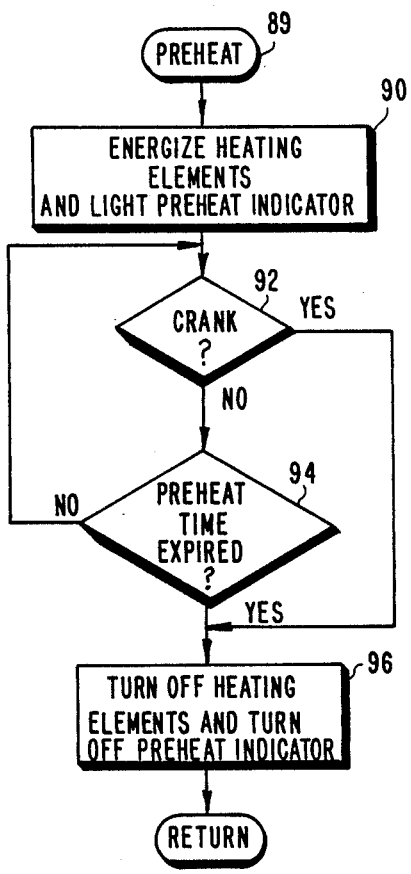
FIG. 2B is a flow chart of the preheat subroutine.

Referring now to FIG. 2B, a flow chart is shown for the preheat subroutine called at step 62 of FIG. 2A. Beginning at step 89, the preheat subroutine continues at step 90 where the heating elements 32 and 34 begin to warm intake air and the preheat indicator is illuminated. Microprocessor 14 energizes relays 26 and 28 to activate the heating elements 32 and 34. Preheat parameters are contained in the ROM of microprocessor 14 according to Table 1. Program execution continues at step 92 where microprocessor 14 tests signal 19 and checks for a crank condition. If "crank" is detected at step 92, program execution skips to step 96 where the heating elements are turned off by turning off relays 26 and 28 and the preheat indicator is extinguished. If "crank" is not detected at step 92, program execution continues at step 94 where the preheat time out period is tested. Microprocessor 14 can determine elapsed time by simply executing a program loop of fixed duration and implementing a counter in random access memory (RAM) internal to the microprocessor to count time increments. If preheat time has not expired, program execution returns to step 92 where "crank" is once again tested. Once the preheat time has expired, program execution continues at step 96 where the microprocessor 14 turns off power to heating elements 32 and 34, the preheat indicator is extinguished, and the subroutine returns to the calling program.

Figure 2C:
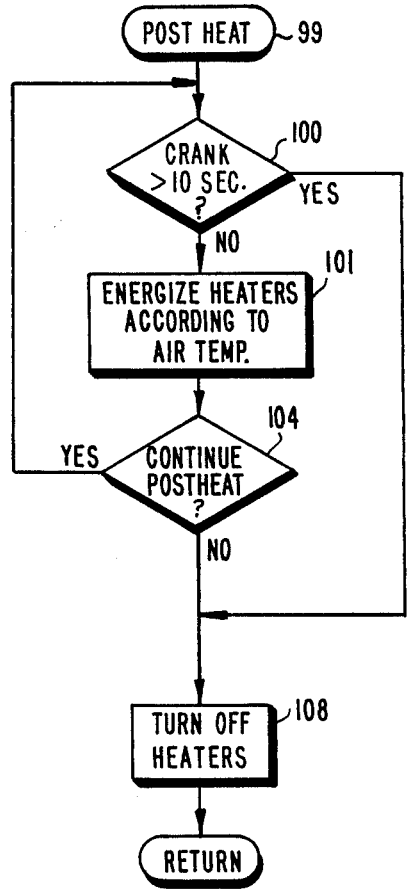
FIG. 2C is a flow chart of the postheat subroutine.

Referring now to FIG. 2C, a flow chart for the postheat subroutine is shown. When the postheat subroutine is invoked, program execution begins at step 99. The microprocessor 14, at step 100, will do a test to determine whether or not the starter system 13 has been "cranking" for greater than 10 seconds. Cranking time greater than 10 seconds is determined according to techniques well known in the art. If a "cranking" interval in excess of 10 seconds has not occurred, program execution continues at step 101. If cranking has occurred for more than 10 seconds, as determined at step 100, program execution continues at step 108 where the heaters 32 and 34 are turned off and program execution returns to the calling program. At step 101, the heating elements 32 and 34 are energized according to the intake manifold air temperature determined at step 58 of FIG. 2A. The "on" time and on/off duty cycling of heating elements 32 and 34 is determined according to Table 1 parameters stored in the ROM of microprocessor 14. Time elapsed into the postheat subroutine is tested at step 104.

Figure 2D:
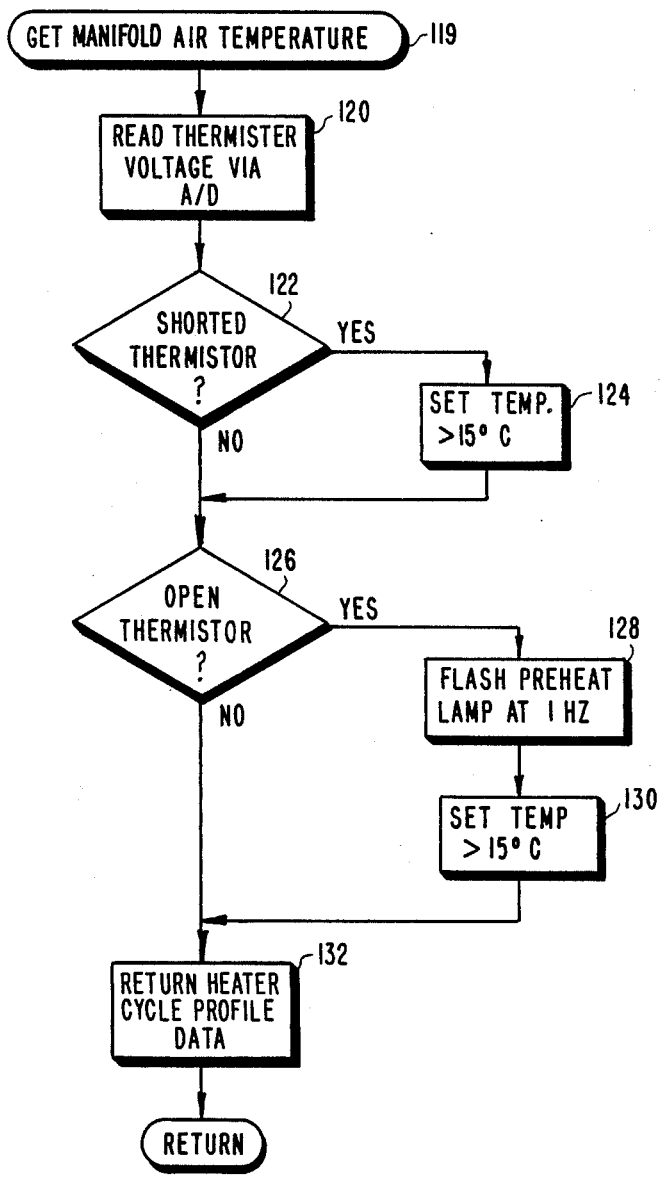
FIG. 2D is a flow chart of the subroutine for obtaining the intake manifold air temperature.

Referring now to FIG. 2D, a subroutine flow chart is shown for step 58 in FIG. 2A. This subroutine could also be called within step 78 of FIG. 2A. At step 119, the subroutine begins, followed by step 120 where voltage signal 22 is quantized by microprocessor 14, thus providing a value indicative of intake manifold air temperature. In order to safeguard against possible equipment failures, at step 122, microprocessor 14 attempts to determine whether or not the thermistor is "shorted" or short circuited. If the voltage at signal 22 is below a predetermined value, the microprocessor 14 determines that the thermistor has shorted and executes step 124 where the variable in memory which corresponds to intake manifold air temperature is set to a value above 15° C. By setting the intake manifold air temperature variable in memory above 15° C., postheat and preheat are effectively by-passed in the software. If the thermistor is not shorted, program execution will continue at step 126 where microprocessor 14 will attempt to determine if thermistor 20 has opened or has infinite resistance. This is determined by monitoring signal 22 for an excessively high voltage condition, wherein signal 22 is above a predetermined value typically at or near the maximum voltage that the A/D input of microprocessor 14 will read or convert. If the thermistor is determined to be open circuited at step 126, the program continues at step 128 wherein the preheat lamp will flash at a 1 hertz rate and the intake manifold air temperature variable is set to a value greater than 15° C. causing the program to by-pass postheat and preheat in the flowchart of FIG. 2A. Program execution continues thereafter at step 132 where the heater cycle profile date as determined by the intake manifold air temperature A/D value is placed into a particular variable or on the "stack" of the microprocessor and subsequently a return to the calling routine is executed. If at step 126 the thermistor is determined to be operating correctly, step 132 is executed wherein the heater cycle profile as directed by the intake manifold air temperature is returned to the calling routine, via a variable or stack memory location. Thereafter program execution returns to the calling routine.

Figure 3:
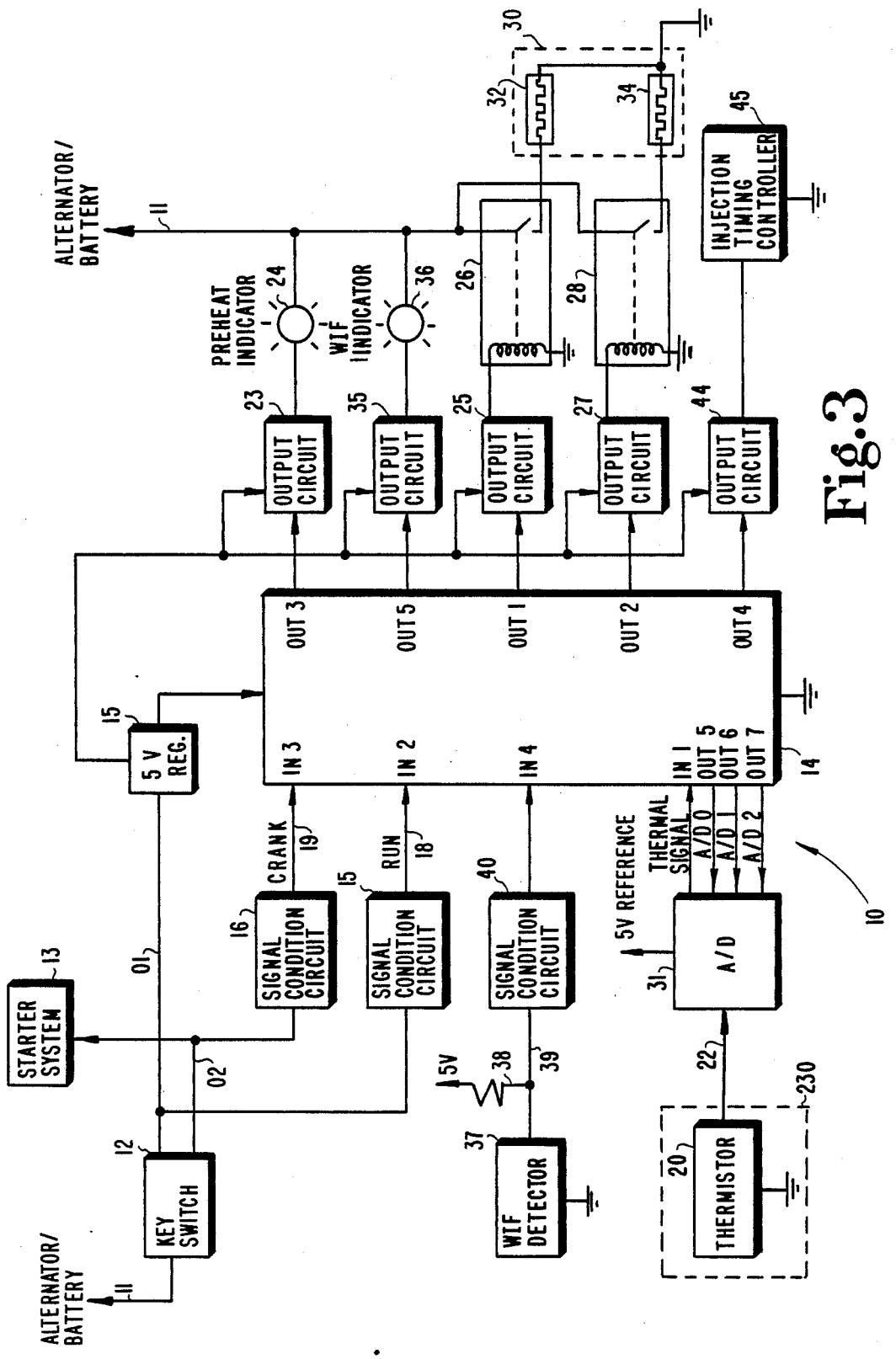
FIG. 3 is a schematic diagram of an air intake heater system according to a another embodiment of the present invention.

Referring now to FIG. 3, a second embodiment of the air intake heater system 210 according to the invention is shown.

Operationally speaking, the second embodiment according to the present invention incorporates the same software, circuitry, and operational parameters as described for the first embodiment. The only difference being that instead of thermistor 20 sensing intake manifold air temperature, the second embodiment utilizes thermistor 20 located in an engine water jacket 230 represented by a broken line, to sense engine coolant temperature.

The microprocessor program included at the end of the description of the preferred embodiments is used with the General Instrument PIC1654 microprocessor in both disclosed embodiments of the air intake heater system according to the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An air intake heater system for use with an internal combustion engine having a battery and corresponding charging system, said air intake heater system comprising:
   (a) electrical air intake heater means for heating intake manifold air;
   (b) temperature monitoring means for monitoring intake manifold air temperature, said temperature monitoring means producing a temperature signal corresponding to intake manifold air temperature;
   (c) first circuit means responsive to said temperature signal and producing a first signal of variable duration based upon said temperature signal;
   (d) second circuit means responsive to said temperature signal and producing a second signal of variable duration based upon said temperature signal when said battery voltage exceeds a predetermined limit; and
   (e) third circuit means responsive to said first and said second signals, said third circuit means supplying a power signal from said battery to said electrical air intake heater means in response to said first and second signals.

2. The air intake heater system of claim 1 wherein said second signal is of variable duration and variable duty cycle, both duration and duty cycle of said second signal based upon said temperature signal.

3. The air intake heater system of claim 1 wherein said first, second, and third circuit means are combined into a single chip microprocessor having input means for monitoring said temperature signal and said battery voltage, said microprocessor further having output means for connecting said air intake heater means to said battery.

4. The air intake heater system of claim 3 wherein said single chip microprocessor means includes analog to digital converter means for monitoring said temperature signal and said battery voltage.

5. The air intake heater system of claim 4 wherein said second signal is of variable duration and variable duty cycle based upon said temperature signal.

6. An air intake heater system for use with an internal combustion engine having a battery and corresponding charging system, said intake air heater system comprising:
   (a) electrical air intake heater means for heating intake manifold air;
   (b) temperature monitoring means for monitoring intake manifold air temperature, said temperature monitoring means producing a temperature signal corresponding to intake manifold air temperature;
   (c) electronic control means for controlling system functions, said battery supplying a power signal to said electronic control means, said electronic control means connected to said temperature signal and responding to said temperature signal by supplying a first heater signal to said electrical air intake heater means when said temperature is below a predetermined limit, said first heater signal having a variable duration corresponding to said temperature signal, said electronic control means also supplying a second heater signal to said electronic air intake heater means when said power signal exceeds a predetermined voltage, said second heater signal also having a variable duration corresponding to said temperature signal.

7. The air intake heater system of claim 6 wherein said electronic control means is a microprocessor having digital input and output means.

8. The air intake heater system of claim 7 wherein said microprocessor includes analog to digital converter means.

9. The air intake heater system of claim 8 wherein said electrical air intake heater means includes a first and a second heating element, said first and second heater signals supplied to said first heating element, said microprocessor producing a third and fourth heater signal, said third and fourth heater signals each having a variable duration corresponding to said temperature signal, said third heater signal supplied to said second heating element when said battery voltage is below a predetermined limit, and said fourth heater signal supplied to said second heating element when said battery voltage is above a predetermined voltage.

10. The air intake heater system of claim 9 including a key switch means for starting and stopping said engine, said key switch means having at least an "on" and an "off" position, said ignition switch connecting said battery to said electronic control means when placed in the "on" position, said electronic control means responding to said key switch being moved from the "off" position to the "on" position by supplying said first and third heater signals to said first and second heating elements respectively when said intake manifold air temperature is below said predetermined limit.

11. The air intake heater system of claim 6 wherein said electronic control means upon sensing said battery voltage above a predetermined voltage causes said second heater signal to have an on/off variable duty cycle dependent upon the magnitude of said temperature signal.

12. An intake air heater system for use with an internal combustion engine comprising:
 (a) electrical air intake heater means for heating intake manifold air;
 (b) temperature monitoring means for monitoring engine coolant temperature, said temperature monitoring means producing a temperature signal corresponding to engine coolant temperature;
 (c) key switch means for starting and stopping said engine, said ignition switch means producing a key signal indicating the position of said key switch means;
 (d) electronic control means for controlling system functions, said control means having a first input, a second input, and first heater control means for supplying a power output signal to said air intake heater means, said temperature signal supplied to said first input and said key signal supplied to said second input, said control means being designed and arranged to respond to said key switch means by:
  activating said heater output means when said key switch is activated if said temperature signal indicates engine coolant temperature is below a predetermined limit; and
  repetitively activating and deactivating said heater output means when said key signal exceeds a predetermined voltage and said temperature signal indicates coolant temperature is below a predetermined limit; and
 (e) power supply means for supplying electrical power to said control means and said temperature monitoring means.

13. The air intake heater system of claim 12 wherein said electronic control means is a microprocessor having digital input and output means and analog to digital converter input means.

14. The air intake heater system of claim 13 wherein said key switch means has an off position, an on position, and a start position.

15. The air intake heater system of claim 14 wherein said electrical air intake heater means includes a first and a second heating element and said electronic control means includes a second heater control means, said first heater control means connected to said first heating element and said second heating control means connected to said second heating element, said electronic control means activating said second heater control means when said first heater control means is activated.

16. The air intake heater system of claim 15 wherein said electronic control means activates said first and second heater control means only when said key switch is activated and said coolant temperature is below said predetermined limit.

17. The air intake heater system of claim 12 wherein said electronic control means upon sensing said key switch signal above a predetermined voltage activates said heater control means in an on/off cyclical manner with a duty cycle dependent upon the magnitude of said temperature signal.

* * * * *

UNITED STATES PATENT AND TRADEMARK OFFICE
CERTIFICATE OF CORRECTION

PATENT NO. : 4,944,260

DATED : July 31, 1990

INVENTOR(S) : Patrick R. Shea et al.

It is certified that error appears in the above-identified patent and that said Letters Patent is hereby corrected as shown below:

On the title page, box 75, please change the city and state of inventor Robert T. Niemczyk from "Montgomery, Ala." to --Indianapolis, Ind.--;

In column 3, line 18, please change the word "purpose" to --purposes--;

In column 8, line 22, of TABLE 2, please change "1.00'" to --1.00µ--;

In column 8, line 66, of TABLE 2, please change "220 82 F" to --220uF--;

In column 9, line 4, of TABLE 2, please insert the following that was omitted: --D5  1N4004--.

Signed and Sealed this

First Day of October, 1991

Attest:

HARRY F. MANBECK, JR.

Attesting Officer

Commissioner of Patents and Trademarks